US012812142B2

(12) United States Patent
Tsai et al.

(10) Patent No.: US 12,812,142 B2
(45) Date of Patent: Nov. 24, 2026

(54) ACCESSING NEIGHBORING SAMPLES FOR CROSS-COMPONENT NON-LINEAR MODEL DERIVATION

(71) Applicant: MEDIATEK INC., Hsinchu City (TW)

(72) Inventors: Chia-Ming Tsai, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/992,824

(22) PCT Filed: Jun. 30, 2023

(86) PCT No.: PCT/CN2023/104344
§ 371 (c)(1),
(2) Date: Jan. 9, 2025

(87) PCT Pub. No.: WO2024/017006
PCT Pub. Date: Jan. 25, 2024

(65) Prior Publication Data
US 2025/0247553 A1 Jul. 31, 2025

Related U.S. Application Data

(60) Provisional application No. 63/369,086, filed on Jul. 22, 2022.

(51) Int. Cl.
*H04N 19/196* (2014.01)
*H04N 19/105* (2014.01)
(Continued)

(52) U.S. Cl.
CPC ......... *H04N 19/196* (2014.11); *H04N 19/105* (2014.11); *H04N 19/167* (2014.11); *H04N 19/176* (2014.11)

(58) Field of Classification Search
CPC .. H04N 19/196; H04N 19/105; H04N 19/167; H04N 19/176
USPC .................................................... 375/240.12
See application file for complete search history.

(56) References Cited

U.S. PATENT DOCUMENTS 12,081,763 B2 9/2024 Koo
2014/0198855 A1* 7/2014 Sole Rojals ........... H04N 19/59 375/240.16
(Continued)

FOREIGN PATENT DOCUMENTS

CN 113940074 A 1/2022
WO 2020149630 A1 7/2020
WO 2021083376 A1 5/2021

OTHER PUBLICATIONS

International Search Report and Written Opinion dated Sep. 25, 2023, issued in application No. PCT/CN2023/104344.

*Primary Examiner* — Matthew David Kim
(74) *Attorney, Agent, or Firm* — McClure, Qualey & Rodack, LLP

(57) ABSTRACT

A method for deriving a cross component or convolution model when encoding or decoding a current block of a current picture of a video is provided. The video coder retrieves a set of reconstructed component samples for a first set of pixel positions that are required for deriving a component prediction model of the current block. The video coder generates a set of padded component samples for a second set of pixel positions that are required for deriving the component prediction model based on the retrieved set of reconstructed component samples. The video coder derives the component prediction model by using the retrieved set of reconstructed component samples and the generated set of padded component samples. The video
(Continued)

coder encodes or decodes the current block by using the component prediction model to generate a predictor for the current block.

14 Claims, 16 Drawing Sheets

(51) Int. Cl.
*H04N 19/167* (2014.01)
*H04N 19/176* (2014.01)

(56) References Cited

U.S. PATENT DOCUMENTS

| | | | | |
|---|---|---|---|---|
| 2015/0264402 | A1* | 9/2015 | Zhang | H04N 19/157 375/240.18 |
| 2015/0373349 | A1* | 12/2015 | Zhang | H04N 19/13 375/240.02 |
| 2019/0306516 | A1* | 10/2019 | Misra | H04N 19/593 |
| 2020/0099949 | A1* | 3/2020 | Xu | H04N 19/176 |
| 2020/0128272 | A1* | 4/2020 | Jangwon | H04N 19/157 |
| 2020/0154115 | A1* | 5/2020 | Ramasubramonian | H04N 19/176 |
| 2020/0236030 | A1* | 7/2020 | Seregin | H04N 19/91 |
| 2020/0382800 | A1* | 12/2020 | Zhang | H04N 19/103 |
| 2021/0152841 | A1* | 5/2021 | Hu | H04N 19/44 |
| 2021/0227229 | A1 | 7/2021 | Ma | |
| 2021/0314575 | A1* | 10/2021 | Li | H04N 19/593 |
| 2021/0400279 | A1* | 12/2021 | Ko | H04N 19/176 |
| 2022/0019204 | A1* | 1/2022 | Maury | G05B 19/41805 |
| 2022/0279161 | A1* | 9/2022 | Lim | H04N 19/105 |
| 2023/0036581 | A1* | 2/2023 | Wang | H04N 19/593 |

* cited by examiner

ACCESSING NEIGHBORING SAMPLES FOR CROSS-COMPONENT NON-LINEAR MODEL DERIVATION

CROSS REFERENCE TO RELATED PATENT APPLICATION(S)

The present disclosure is part of a non-provisional application that claims the priority benefit of U.S. Provisional Patent Application No. 63/369,086, filed on 22 Jul. 2022. Content of above-listed applications is herein incorporated by reference.

TECHNICAL FIELD

The present disclosure relates generally to video coding. In particular, the present disclosure relates to methods of coding pixel blocks by cross-component model derivation.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTCI/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one-color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method for deriving a cross component or convolution model when encoding or decoding a current block of a current picture of a video. The video coder retrieves a set of reconstructed component samples for a first set of pixel positions that are required for deriving a component prediction model of the current block. The video coder generates a set of padded component samples for a second set of pixel positions that are required for deriving the component prediction model based on the retrieved set of reconstructed component samples. The encoder may generate each padded component sample by replicating a nearest retrieved reconstructed component sample, or a predefined value, or a middle value defined by a bit-depth of a current sample. The video coder derives the component prediction model by using the retrieved set of reconstructed component samples and the generated set of padded component samples. The video coder encodes or decodes the current block by using the component prediction model to generate a predictor for the current block.

In some embodiments, the second set of pixel positions are designated as having unavailable or forbidden reconstructed samples based on a boundary. The second set of pixel positions may correspond to component samples inside the current block. The second set of pixel positions may correspond to component samples in a left-above neighboring area of the current block. The second set of pixel positions may be outside a data pipeline unit that encompasses the current block. The boundary may be that of a buffer storing one or more rows of reconstructed coding tree units (CTUs).

In some embodiments, the component prediction model is derived by corresponding target component samples and predicted component samples, with each predicted component sample generated based on a collocated component sample and a set of surrounding component samples (e.g., "N", "S", "W", "E", "NW", "NE", "SE", "SW" samples surrounding a collocated sample "C"). In some embodiments, surrounding component samples at pixel positions beyond the boundary are replaced by padded component samples. The component prediction model may be a cross-component model, such that the target component samples are chroma samples, and the collocated and surrounding component samples are luma samples.

In some embodiments, the target component samples and the collocated component samples are samples of a reference area neighboring the current block. Some of the surrounding component samples may be samples in an extension area just beyond the reference area.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross Component Linear Model (CCLM)

Cross Component Linear Model (CCLM) or Linear Model (LM) mode is a cross component prediction mode in which chroma components of a block is predicted from the collocated reconstructed luma samples by linear models. The parameters (e.g., scale and offset) of the linear model are derived from already reconstructed luma and chroma samples that are adjacent to the block. For example, in VVC, the CCLM mode makes use of inter-channel dependencies to predict the chroma samples from reconstructed luma samples. This prediction is carried out using a linear model in the form of:

$$P(i, j) = \alpha \cdot rec'_L(i, j) + \beta \quad (1)$$

P(i, j) in eq. (1) represents the predicted chroma samples in a CU (or the predicted chroma samples of the current CU) and $rec'_L(i, j)$ represents the down-sampled reconstructed luma samples of the same CU (or the corresponding reconstructed luma samples of the current CU).

The CCLM model parameters α (scaling parameter) and β (offset parameter) are derived based on at most four neighboring chroma samples and their corresponding down-sampled luma samples. In LM_A mode (also denoted as LM-T mode), only the above or top-neighboring template is used to calculate the linear model coefficients. In LM_L mode (also denoted as LM-L mode), only left template is used to calculate the linear model coefficients. In LM-LA mode (also denoted as LM-LT mode), both left and above templates are used to calculate the linear model coefficients.

Figure 1:
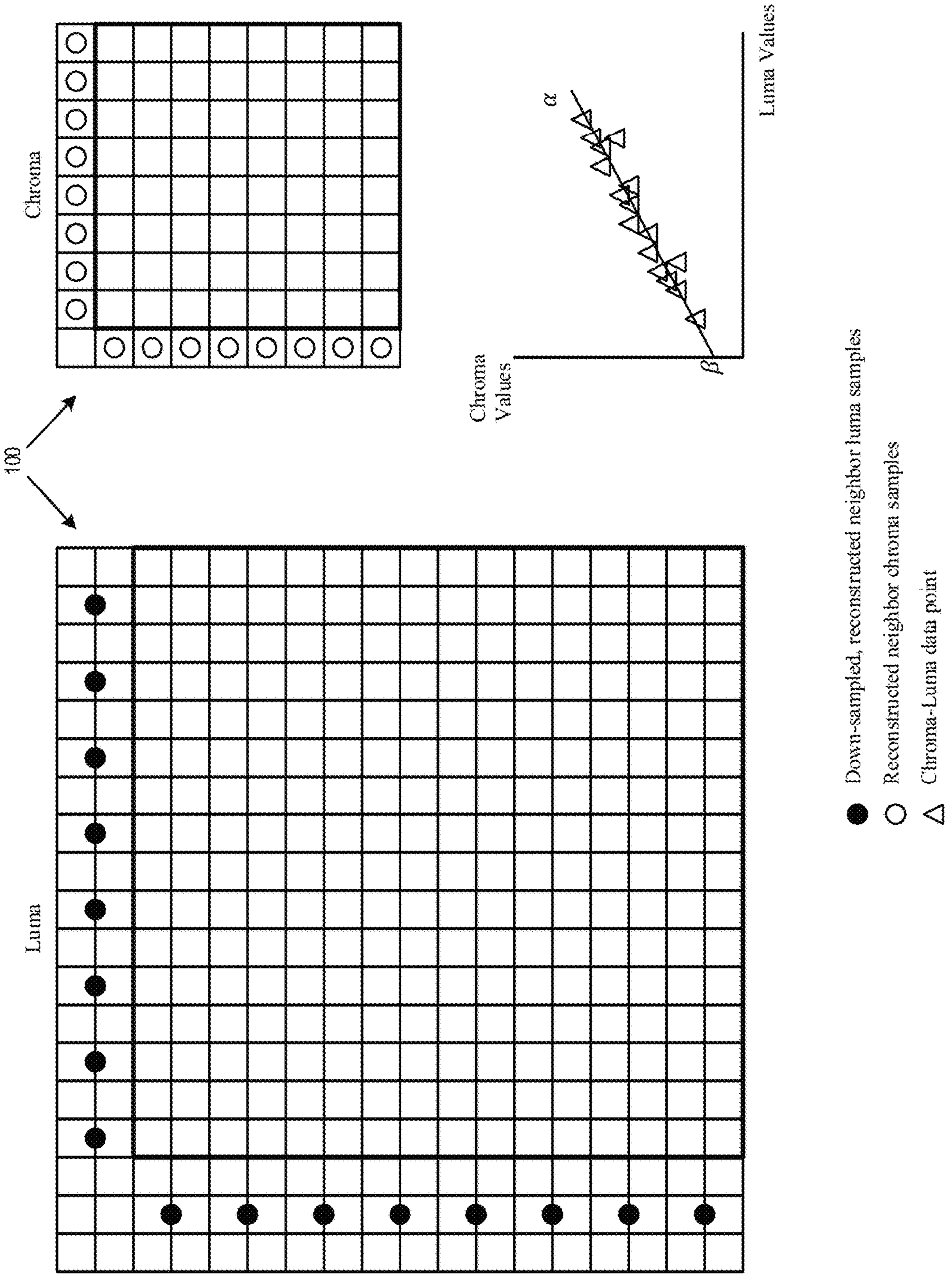
FIG. 1 conceptually illustrates chroma and luma samples that are used for derivation of linear model parameters.

FIG. 1 conceptually illustrates chroma and luma samples that are used for derivation of linear model parameters. The figure illustrates a current block 100 having luma component samples and chroma component samples in 4:2:0 format. The luma and chroma samples neighboring the current block are reconstructed samples. These reconstructed samples are used to derive the cross-component linear model (parameters α and β). Since the current block in in 4:2:0 format, the luma samples are down-sampled first before being used for linear model derivation. In the example, there are 16 pairs of reconstructed luma (down-sampled) and chroma samples neighboring the current block. These 16 pairs of luma versus chroma values are used to derive the linear model parameters.

Suppose the current chroma block dimensions are W×H, then W' and H' are set as

W'=W, H'=H when LM-LT mode is applied;

W'=W+H when LM-T mode is applied;

H'=H+W when LM-L mode is applied

The above neighboring positions are denoted as S[0, −1] . . . S[W'−1, −1] and the left neighboring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied (both above and left neighboring samples are available);

S[W'/8, −1], S[3*W'/8, −1], S[5*W'/8, −1], S[7*W'/8, −1] when LM-T mode is applied (only the above neighboring samples are available);

S[−1, H'/8], S[−1, 3*H'/8], S[−1, 5*H'/8], S[−1, 7*H'/8] when LM-L mode is applied (only the left neighboring samples are available);

The four neighboring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $X_A$, $X_B$, $Y_A$ and $Y_B$ are derived as:

$$X_a = (x_A^0 + x_A^1 + 1) \gg 1;\ X_b = (x_B^0 + x_B^1 + 1) \gg 1; \quad (2)$$

$$Y_a = (y_A^0 + y_A^1 + 1) \gg 1;\ Y_b = (y_B^0 + y_B^1 + 1) \gg 1 \quad (3)$$

The linear model parameters α and β are obtained according to the following equations $$\alpha = \frac{Y_a - Y_b}{X_a - X_b} \quad (4)$$

$$\beta = Y_b - \alpha \bullet X_b \quad (5)$$

The operations to calculate the α and β parameters according to eq. (4) and (5) may be implemented by a look-up table. In some embodiments, to reduce the memory required for storing the look-up table, the diff value (difference between maximum and minimum values) and the parameter α are expressed by an exponential notation. For example, diff is approximated with a 4-bit significant part and an exponent. Consequently, the table for 1/diff is reduced to 16 elements for 16 values of the significand as follows:

$$DivTable\,[\,] = \{0, 7, 6, 5, 5, 4, 4, 3, 3, 2, 2, 1, 1, 1, 1, 0\} \quad (6)$$

This reduces the complexity of the calculation as well as the memory size required for storing the needed tables.

In some embodiments, to get more samples for calculating the CCLM model parameters α and β, the above template is extended to contain (W+H) samples for LM-T mode, the left template is extended to contain (H+W) samples for LM-L mode. For LM-LT mode, both the extended left template and the extended above templates are used to calculate the linear model coefficients.

To match the chroma sample locations for 4:2:0 video sequences, two types of down-sampling filters are applied to luma samples to achieve 2 to 1 down-sampling ratio in both horizontal and vertical directions. The selection of down-sampling filter is specified by a sequence parameter set (SPS) level flag. The two down-sampling filters are as follows, which correspond to "type-0" and "type-2" content, respectively.

$$rec'_L(i, j) = [rec_L(2i-1, 2j-1) + 2j-1) + 2 * rec_L(2i-1, 2j-1) + rec_L(2i+1, 2j-1) + rec_L(2i-1, 2j) + rec_L(2i+1, 2j) + 4] \gg 3 \quad (7)$$

$$rec'_L(i, j) = [rec_L(2i, 2j-1) + rec_L(2i-1, 2j) + 4 * rec_L(2i, 2j) + rec_L(2i-1, 2j) + rec_L(2i, 2j+1) + 4] \gg 3 \quad (8)$$

In some embodiments, the α and β parameters computation is performed as part of the decoding process, and is not just as an encoder search operation. As a result, no syntax is used to convey the α and β values to decoder.

For chroma intra mode coding, a total of 8 intra modes are allowed. Those modes include five traditional intra modes and three cross-component linear model modes (LM_LA, LM_A, and LM_L). Chroma intra mode coding may directly depend on the intra prediction mode of the corresponding luma block. Chroma intra mode signaling and corresponding luma intra prediction modes are according to the following table:

| Chroma Intra Prediction | Corresponding Luma Intra Prediction Mode | | | | |
|---|---|---|---|---|---|
| Mode | 0 | 50 | 18 | 1 | X (0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Since separate block partitioning structure for luma and chroma components is enabled in I slices, one chroma block may correspond to multiple luma blocks. Therefore, for chroma derived mode (DM) mode, the intra prediction mode of the corresponding luma block covering the center position of the current chroma block is directly inherited.

A single unified binarization table (mapping to bin string) is used for chroma intra prediction mode according to the following table:

| Chroma intra prediction mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In the Table, the first bin indicates whether it is regular (0) or LM mode (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in the table are context coded with its own context model, and the rest bins are bypass coded.

In addition, in order to reduce luma-chroma latency in dual tree, when the 64×64 luma coding tree node is not split (and ISP is not used for the 64×64 CU) or partitioned with QT, the chroma CUs in 32×32/32×16 chroma coding tree node are allowed to use CCLM in the following way:

- If the 32×32 chroma node is not split or partitioned with QT split, all chroma CUs in the 32×32 node can use CCLM.
- If the 32×32 chroma node is partitioned with Horizontal BT, and the 32×16 child node does not split or uses Vertical BT split, all chroma CUs in the 32×16 chroma node can use CCLM.
- In all the other luma and chroma coding tree split conditions, CCLM is not allowed for chroma CU.

II. Multi-Model CCLM (MMLM)

Multiple model CCLM mode (MMLM) uses two models for predicting the chroma samples from the luma samples for the whole CU. Similar to CCLM, three multiple model CCLM modes (MMLM_LA, MMLM_A, and MMLM_L) are used to indicate if both above and left neighboring samples, only above neighboring samples, or only left neighboring samples are used in model parameters derivation.

In MMLM, neighbouring luma samples and neighbouring chroma samples of the current block are classified into two groups, each group is used as a training set to derive a linear model (i.e., a particular α and β are derived for a particular group). Furthermore, the samples of the current luma block are also classified based on the same rule for the classification of neighbouring luma samples.

Figure 2:
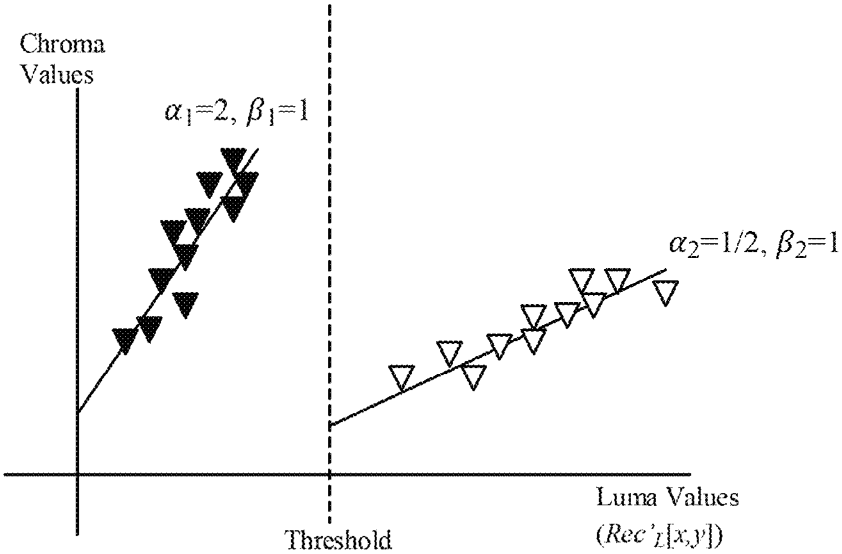
FIG. 2 shows an example of classifying the neighbouring samples into two groups.

FIG. 2 shows an example of classifying the neighbouring samples into two groups. Threshold is calculated as the average value of the neighbouring reconstructed luma samples. A neighbouring sample at [x,y] with $Rec'_L[x,y] \le$ Threshold is classified into group 1; while a neighbouring sample at [x,y] with $Rec'_L[x,y] >$ Threshold is classified into group 2. Thus, the multi-model CCLM prediction for the chroma samples is:

$$Pred_c[x, y] = \alpha_1 \times Rec'_L[x, y] + \beta_1 \quad \text{if } Rec'_L[x, y] \le \text{Threshold}$$

$$Pred_c[x, y] = \alpha_2 \times Rec'_L[x, y] + \beta_2 \quad \text{if } Rec'_L[x, y] > \text{Threshold}$$

III. Convolutional Cross-Component Model

Figure 3:
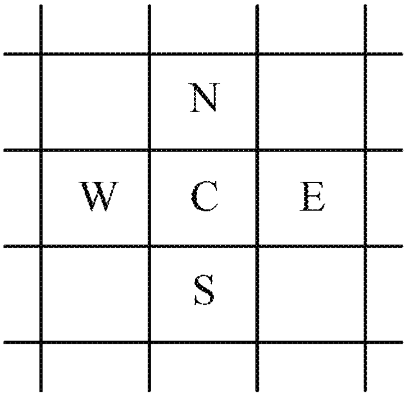
FIG. 3 conceptually illustrates the spatial components of a convolutional filter.

In some embodiments, a convolutional cross-component model (CCCM) is applied to improve the cross-component prediction performance. For some embodiment, the convolutional model has 7-tap filter having a 5-tap plus sign shape spatial component, a non-linear term and a bias term. The input to the spatial 5-tap component of the filter includes a center (C) luma sample (which is collocated with the chroma sample to be predicted) and the center luma sample's above/north (N), below/south(S), left/west (W) and right/east (E) neighbors. FIG. 3 conceptually illustrates the spatial components of a convolutional filter. The nonlinear term (denoted as P) is represented as power of two of the center luma sample C and scaled to the sample value range of the content:

$$P = (C * C + \text{mid}Val) \gg \text{bitDepth} \tag{9}$$

Thus, for 10-bit content the non-linear term P is calculated as:

$$P = (C * C + 512) \gg 10$$

The bias term (denoted as B) represents a scalar offset between the input and output (similarly to the offset term in CCLM) and is set to middle chroma value (512 for 10-bit content). Output of the filter is calculated as a convolution between the filter coefficients ci and the input values and clipped to the range of valid chroma samples:

$$predChromaVal = c_0C + c_1N + c_2S + c_3E + c_4W + c_5P + c_6B \tag{10}$$

The filter coefficients ci are calculated by minimizing MSE between the reconstructed (or target) chroma samples in a reference area and their corresponding predicted chroma samples. Each predicted chroma sample is generated from a collocated luma sample and its surrounding luma samples using a derived component prediction model such as Eq. (10). Eq. (10) is a convolution model based on taps for the center sample and four surrounding samples (C, N, S, E, W). More generally, eq. (10) can be expanded to include taps for the center sample and 8 surrounding samples (C, N, S, E, W, NE, NW, SE, SW.) Eq. (10) and its expanded form can more generally be referred to as a component prediction model (as it can be used for cross-component prediction or intra-component prediction).

Figure 4:
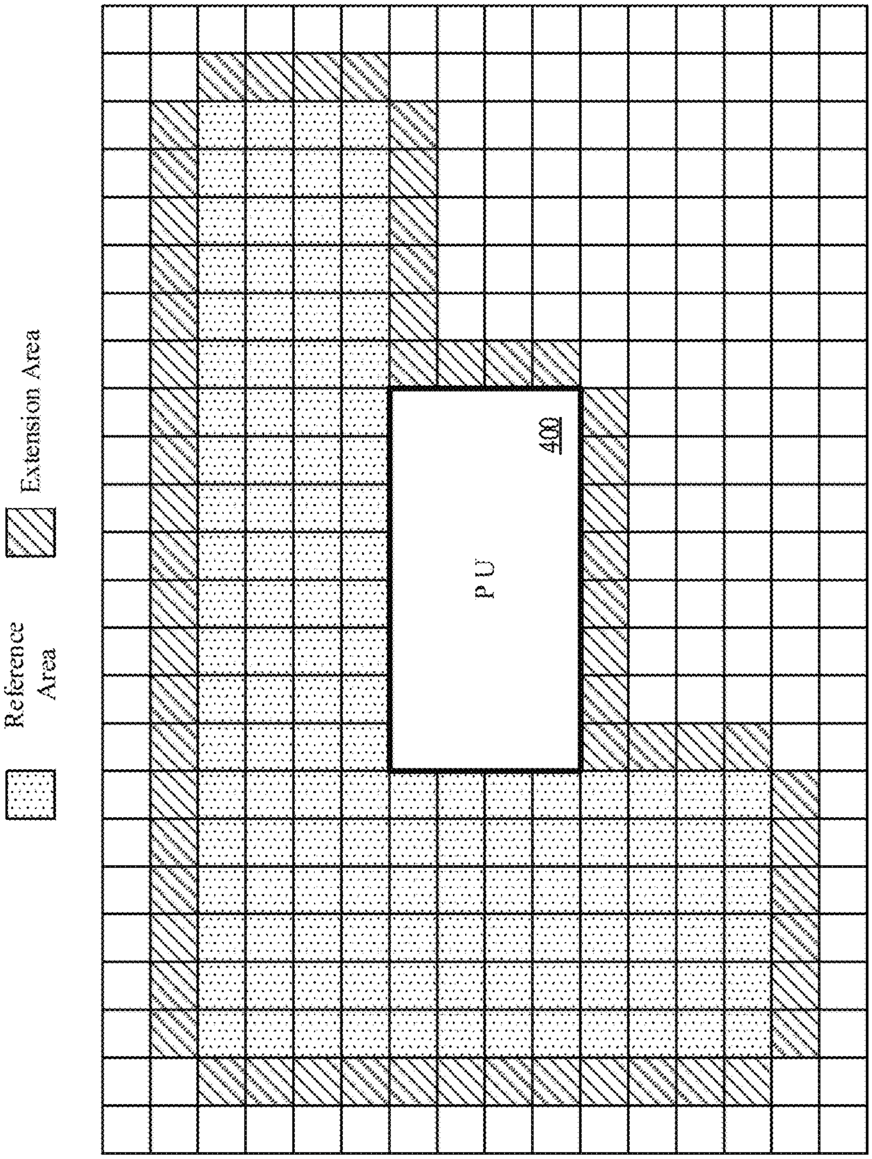
FIG. 4 illustrates a reference area that is used to derive filter coefficients for a convolution model for a current block.

FIG. 4 illustrates a reference area that is used to derive filter coefficients for a convolution model for a current block. The reference area includes (reference) lines of (chroma) samples above and left of the current block 400.

(The current block 400 is a PU in this example). The reference area extends one PU width to the right and one PU height below the PU boundaries. The reference area may be adjusted to include only available samples. An extension area to the reference area is used to support the "side samples" of the plus shaped spatial filter (e.g., N, E, W, S samples as described by reference to FIG. 3 above, and in addition, NW, NE, SW, SE samples) and are padded when in unavailable areas.

The MSE minimization may be performed by calculating an autocorrelation matrix for the luma input and a cross-correlation vector between the luma input and chroma output. The autocorrelation matrix is LDL decomposed and the final filter coefficients are calculated using back-substitution. The process is similar to the calculation of the ALF filter coefficients in ECM, however, in some embodiments, LDL decomposition was chosen instead of Cholesky decomposition to avoid using square root operations.

In some embodiments, a higher degree model is used to predict chroma samples, instead of the linear model. The higher degree model may include a k-tap spatial term, a non-linear term (denoted as P), and a bias term (denoted as B), which may be formulated as:

$$pred_c(i, j) = \left(a_0 \times rec_L'^{(i,j)} + \sum_{x=1}^{k-1} a_x \times neiRec_L'^{(x)}\right) + b \times P + c \times B, \quad (11)$$

where $rec'_L{}^{(i,j)}$ is the down-sampled reconstructed luma sample at position (i, j), and $neiRec_L{}^{(x)}$ is one of neighboring samples surrounding $rec'_L{}^{(i,j)}$, and $a_0$, $a_x$, b, and c are model parameters. The higher degree model can be used in deriving model parameters between color components, or between the reference samples of the current frame/picture and reference frames/pictures.

IV. Boundary of Reconstruction Samples for Model Derivation

The higher degree model mode (e.g., Eq. 11) may use reconstruction samples from above, left, and/or left-above neighboring areas of the current block (e.g., the reference area of FIG. 4) to derive model parameters. In some embodiments, when a required neighboring area is outside a restriction boundary or "not available", the required reconstruction samples may be replaced by other available/valid samples, set to a predefined value, or set to the middle chroma value by the current sample bit-depth. The restriction boundary may be that of a CTU, slice, tile, picture boundary, data pipeline unit, or any other boundaries that causes the limitation or shortage when referencing the neighboring reconstructed samples. "Not available" may refer to reconstruction samples inside the current block being not available, or the reconstruction samples inside the left-above, left, or above neighboring area being not available (e.g., not yet reconstructed).

Figure 5:
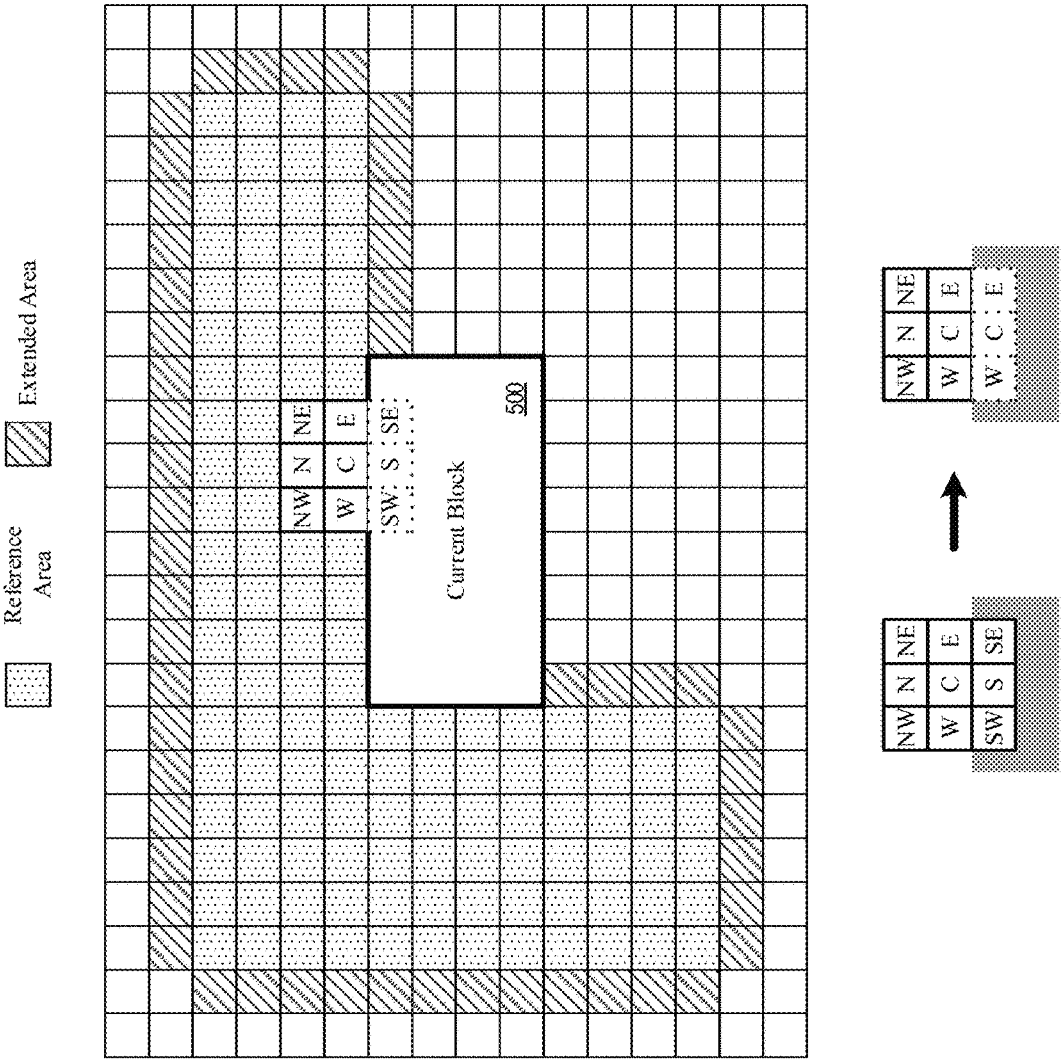
FIG. 5 shows reconstruction samples of a current block that are unavailable for deriving model parameters.

In some embodiments, at least some of the reconstruction samples of the current luma block are unavailable for deriving model parameters. These unavailable reconstruction samples are replaced by other available/valid samples. FIG. 5 shows reconstruction samples of a current block 500 that are unavailable for deriving model parameters. In the example, reconstruction samples "NW", "N", "NE", "W", "C", "E", "SW", "S", "SE" are required for model derivation. However, reconstruction samples "SW", "S", "SE" are forbidden/unavailable for use for deriving model parameters, because samples "SW", "S", "SE" are samples of the current block 500 and may have yet to be reconstructed. In some embodiments, when deriving the model parameters for CCLM or CCCM, the unavailable reconstruction samples are replaced by their nearest available neighboring samples. Thus, "S" is replaced by "C", "SE" is replaced by "E", and "SW" is replaced by "W".

Figure 6:
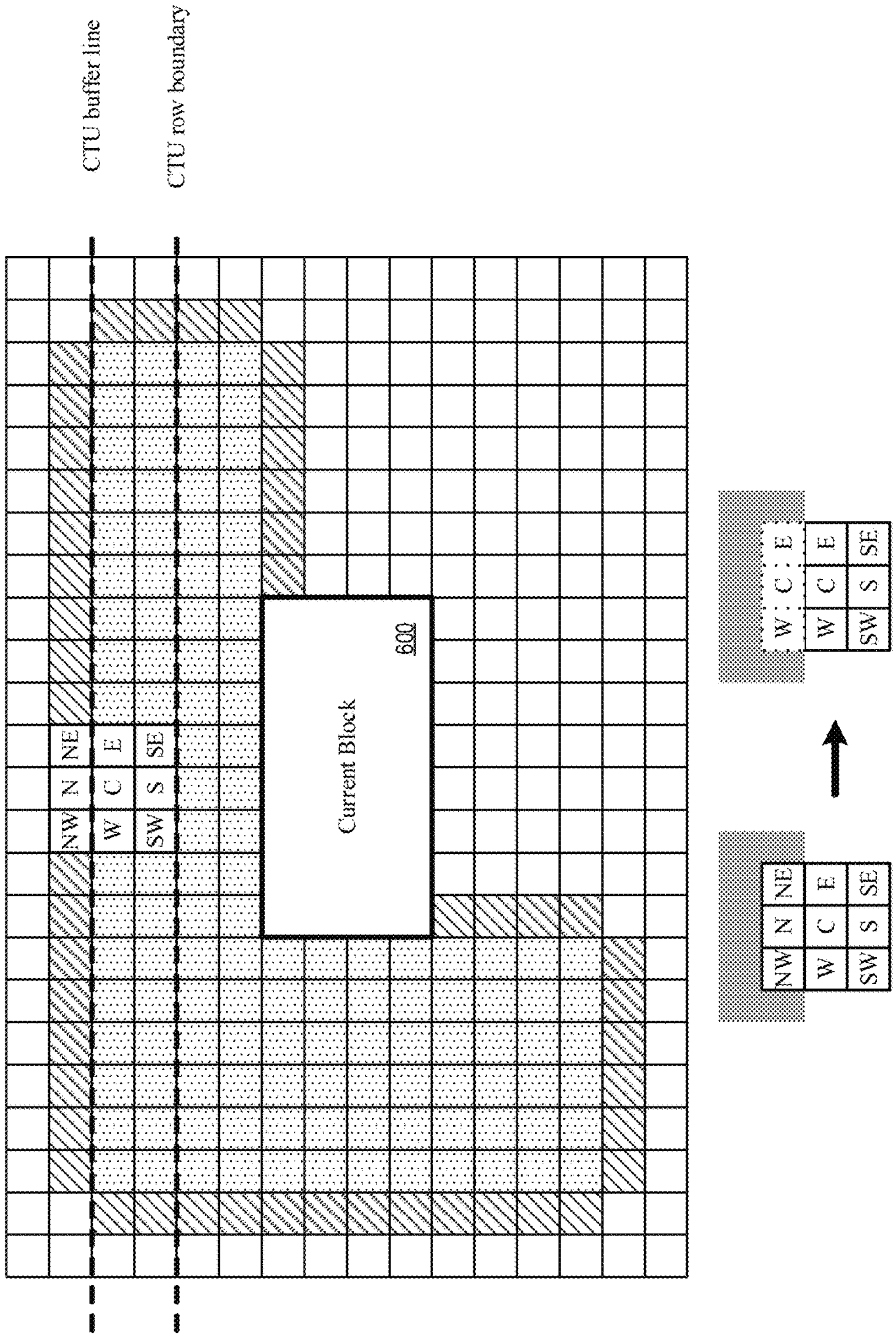
FIG. 6 shows reconstruction samples outside of a coding tree unit (CTU) row that are unavailable for deriving model parameters for a current block.

In some embodiments, reconstruction samples outside a CTU row buffer are forbidden/unavailable when deriving model parameters. These forbidden reconstruction samples may be replaced by other available/valid samples for deriving model parameters. FIG. 6 shows reconstruction samples outside of the CTU row that are unavailable for deriving model parameters for a current block 600. In the figure, the video coder uses a buffer that supports two CTU row lines. Reconstruction samples "NW", "N", "NE", "W", "C", "E", "SW", "S", "SE" are required for model derivation, but reconstruction samples "NW", "N", and "NE" are outside of the CTU line buffer. If the current model requires "NW", "N", and "NE" reconstruction samples to derive model parameters, "NW" is replaced by "W", "N" is replaced by "C", and "NE" is replaced by "E".

Figure 7:
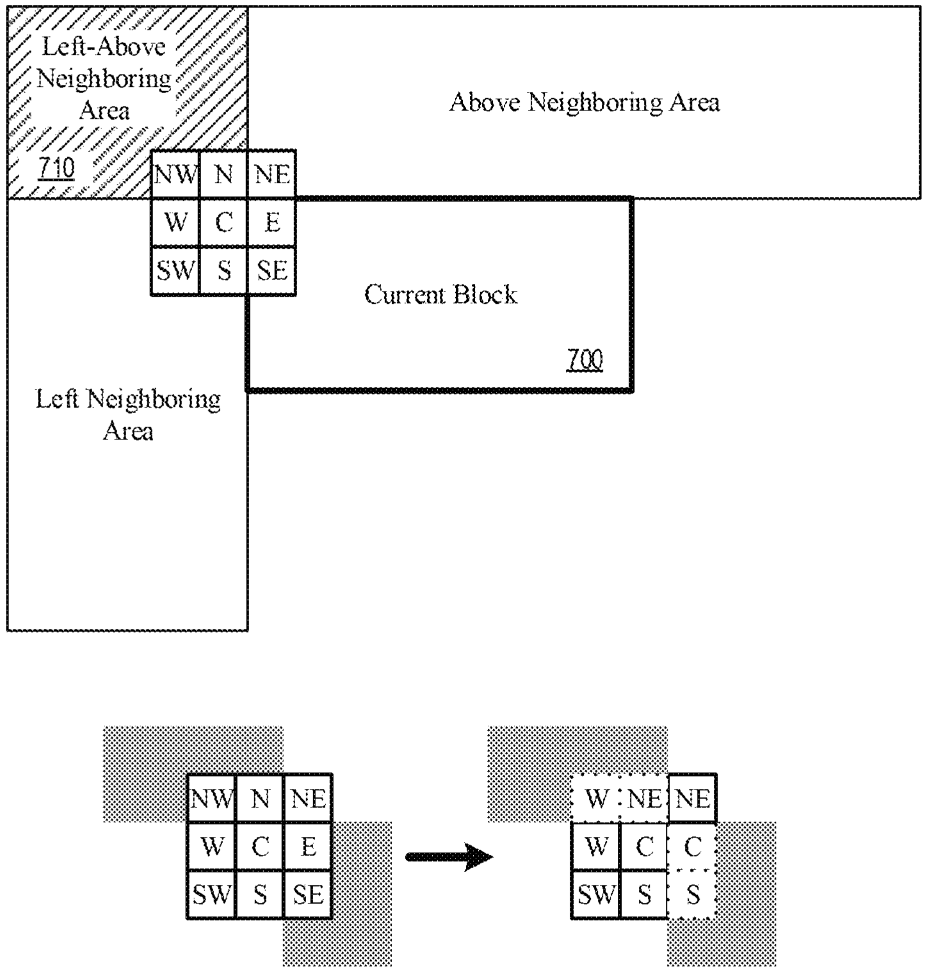
FIG. 7 shows reconstruction samples in the left-above neighboring area of a current block that are unavailable for deriving model parameters.

In some embodiments, reconstruction samples in the left-above neighboring area of the current block are forbidden/unavailable when deriving model parameters. These forbidden reconstruction samples are replaced by other available/valid samples when deriving model parameters. FIG. 7 shows reconstruction samples in the left-above neighboring area of a current block 700 that are unavailable for deriving model parameters. As illustrated, reconstruction samples "NW", "N", "NE", "W", "C", "E", "SW", "S", "SE" are required for model derivation, but reconstruction samples "NW", and "N" are in the left-above neighboring area 710 and therefore not allowed. The unavailable reconstruction samples are replaced by their respective nearest valid reconstruction samples. Thus, "NW" is replaced by "W", and "N" is replaced by "NE". Also, if the reconstruction luma samples from the current block 700 could not be used (e.g., not reconstructed yet), then reconstruction samples "E" and "SE" are forbidden/unavailable for model derivation since they are in the current luma blocks 700 and may not be available. The video coder may replace "E" with "C", and also "SE" with "S" when deriving the model.

Data pipeline units (e.g., VPDU) are defined as non-overlapping square/rectangle units in a picture. In hardware decoders, successive data pipeline units are processed by multiple pipeline stages at the same time. Different stages process different pipeline unit simultaneously. In some embodiments, reconstruction samples outside a current data pipeline unit are forbidden/unavailable for luma reconstruction down-sampling process, deriving model parameters, or generating chroma prediction. These forbidden reconstruction samples are replaced by other available/valid samples.

Figure 8A:
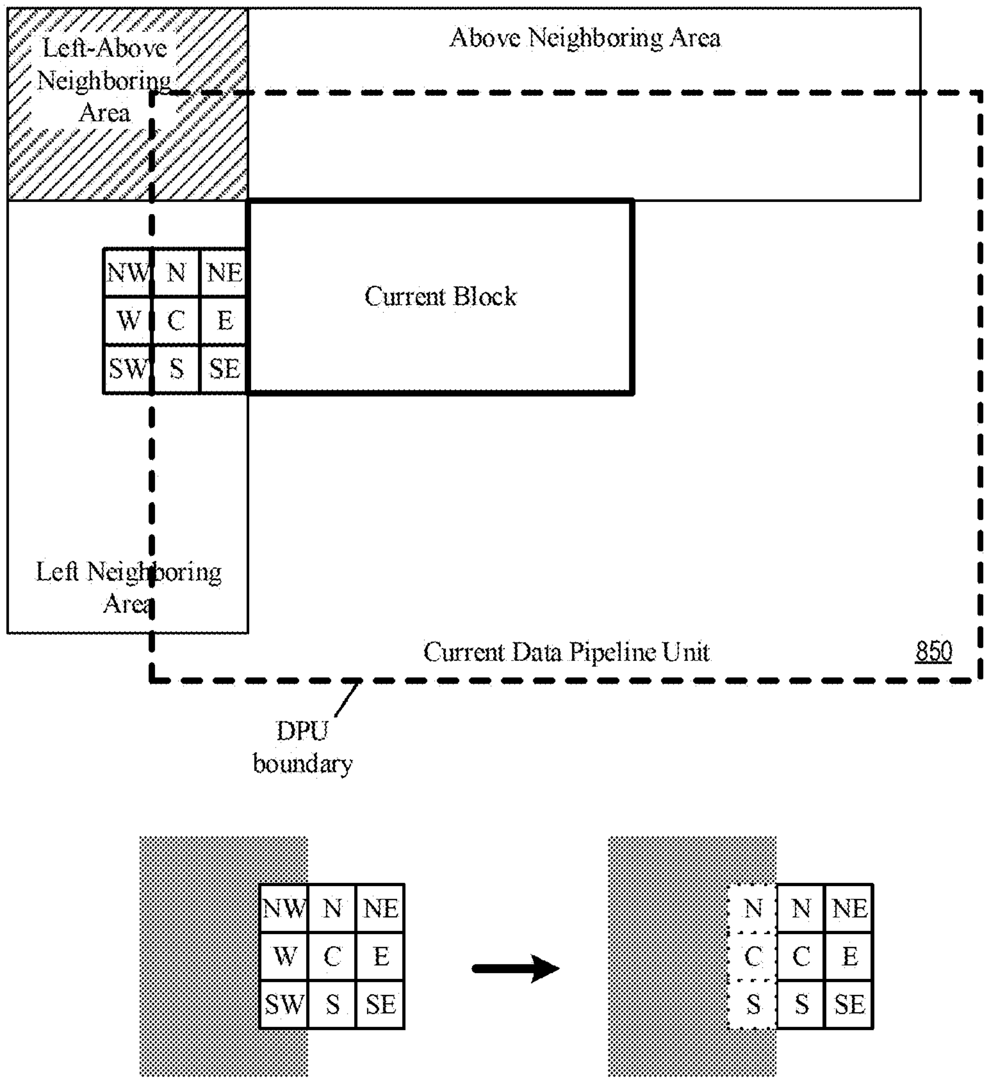
FIGS. 8A-C illustrate reconstruction samples in a current data pipeline unit that are unavailable for deriving model parameters.
Figure 8B:
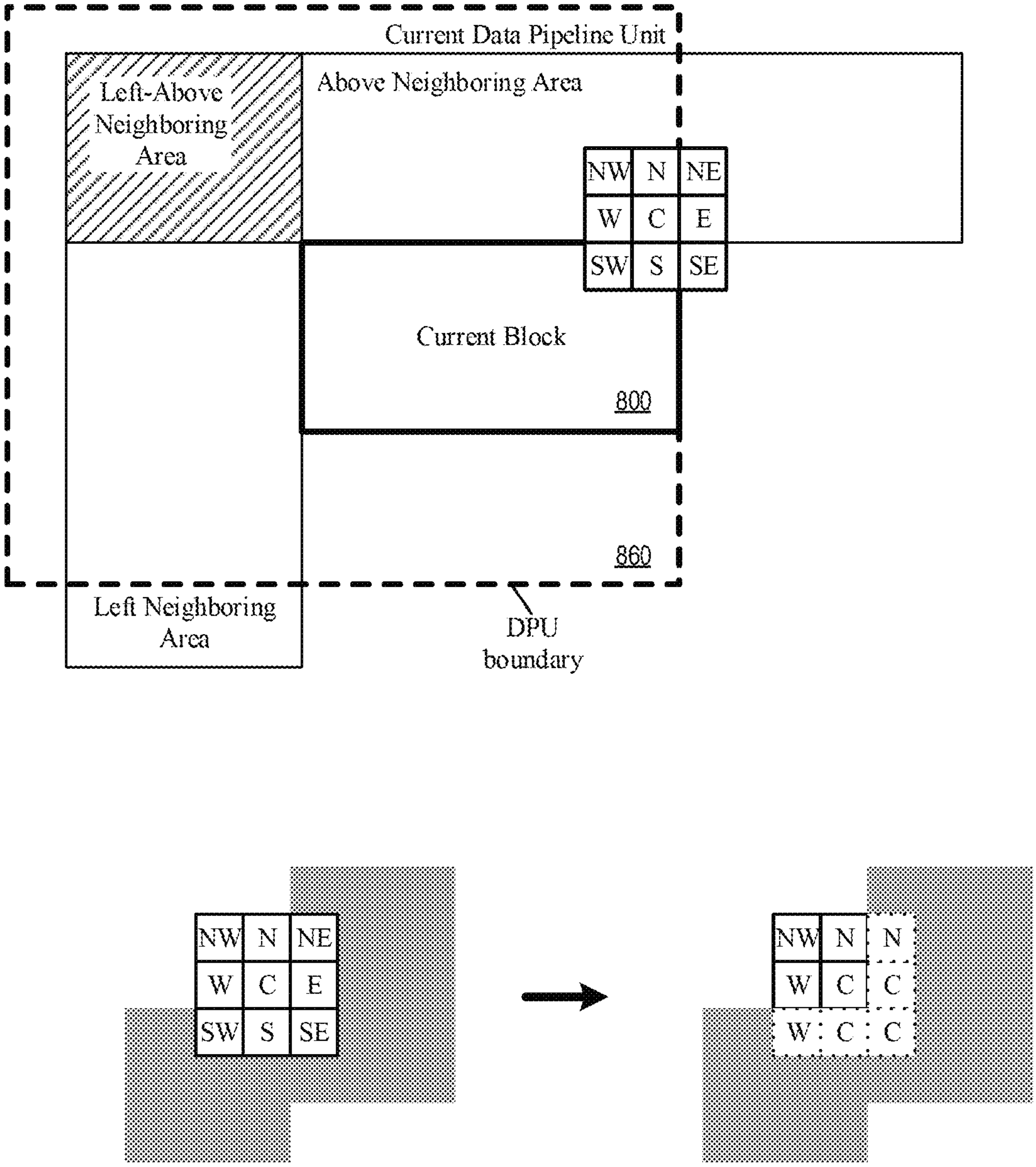
Figure 8C:
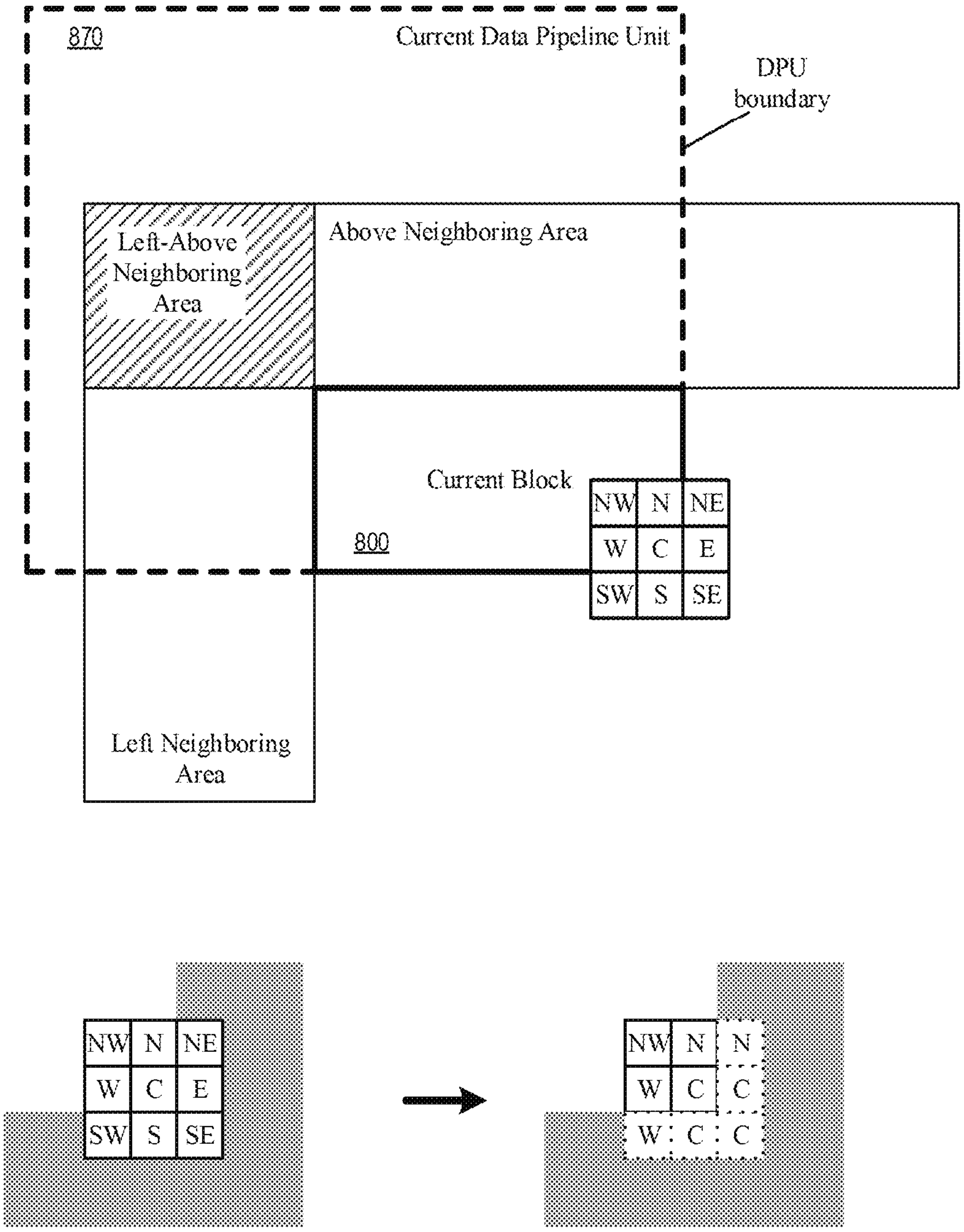

FIGS. 8A-C illustrate reconstruction samples in a current data pipeline unit that are unavailable for deriving model parameters. The current model requires "NW", "N", "NE", "W", "C", "E", "SW", "S", "SE" reconstruction samples for model derivation.

FIG. 8A shows an example in which reconstruction samples "NW", "W", and "SW" are outside a current data pipeline unit 850. These unavailable reconstruction samples are replaced by their respective nearest valid reconstruction samples. The video coder therefore replaces "NW" by "N", "W" by "C", and "SW" by "S", as samples "N", "C", and "S" are within the current data pipeline unit 850.

FIG. 8B shows an example in which samples "NE", "E", and "SE" are outside a current data pipeline unit 860, and samples "SW" and "S" are in the current block 800. These reconstruction samples are therefore not available. The unavailable reconstruction samples are replaced by their respective nearest valid reconstruction samples. The video coder therefore replaces "NE" by "N", "E" by "C", and "SE" by "C". The video coder also replaces "SW" by "W" and replaces "S" by "C".

FIG. 8C shows an example in which the required reconstruction samples "NE", "E", "SE", "S", and "SW" are outside the current data pipeline unit 870 and are unavailable/forbidden. In this example, the model being derived may be a CCLM model that is used to predict chroma samples of the current block based on already reconstructed luma samples of the current block. The unavailable reconstruction samples are replaced by their respective nearest valid/available reconstruction samples. Thus, to generate chroma prediction, "NE" is replaced by "N", "SW" is replaced by "W", and "E", "SE", and "S" are replaced by "C". In this example, the reconstruction luma samples "NW", "N", "W", and "C" of the current block 800 are available.

Any of the foregoing proposed methods can be implemented in encoders and/or decoders. For example, any of the proposed methods can be implemented in an inter/intra/prediction module of an encoder, and/or an inter/intra/prediction module of a decoder. Alternatively, any of the proposed methods can be implemented as a circuit coupled to the inter/intra/prediction module of the encoder and/or the inter/intra/prediction module of the decoder, so as to provide the information needed by the inter/intra/prediction module.

V. Example Video Encoder

Figure 9:
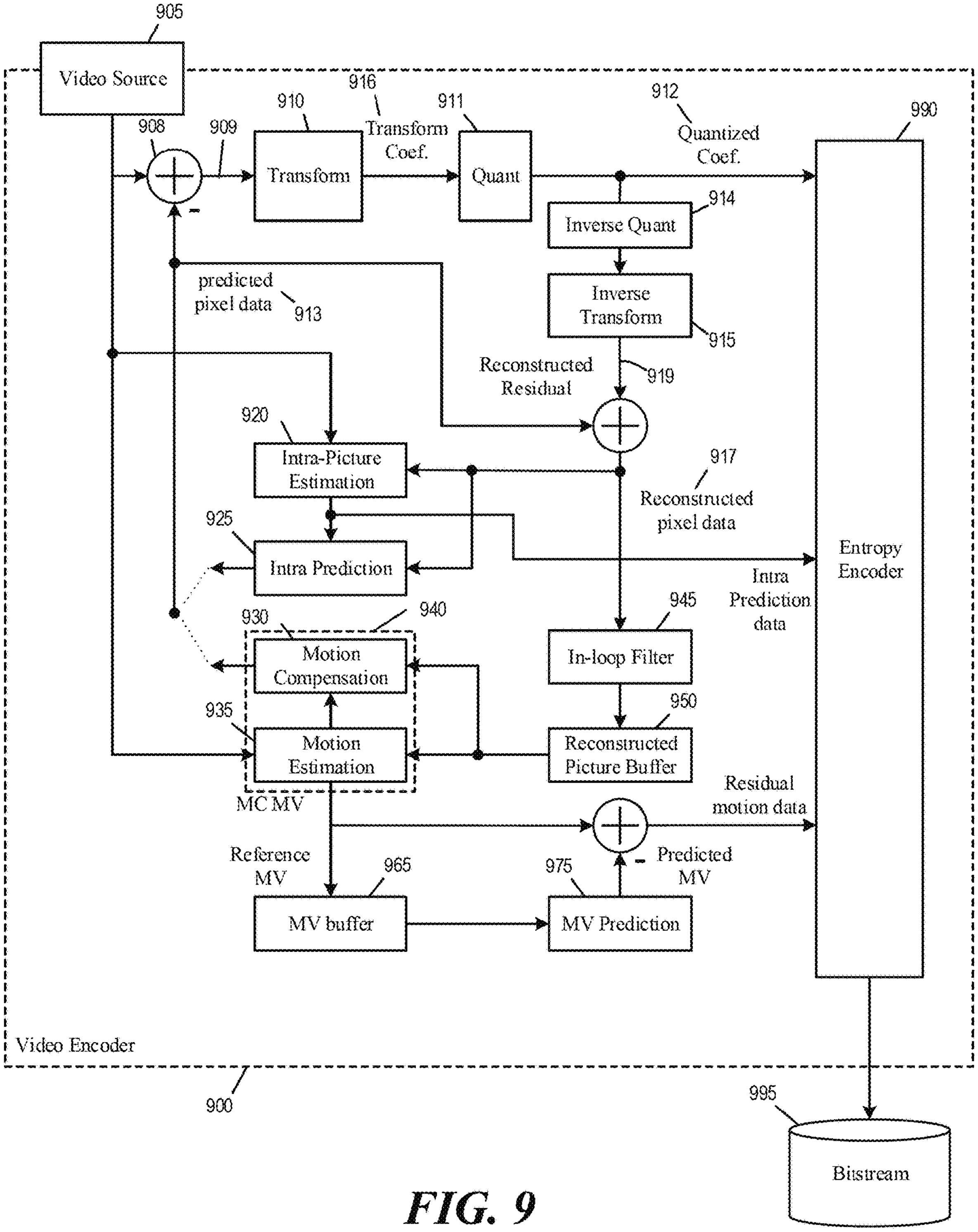
FIG. 9 illustrates an example video encoder that may implement component prediction model.

FIG. 9 illustrates an example video encoder 900 that may implement component prediction model. As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a MV buffer 965, and a MV prediction module 975, and an entropy encoder 990. The motion compensation module 930 and the motion estimation module 935 are part of an inter-prediction module 940.

In some embodiments, the modules 910-990 are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each video frame without compression. A subtractor 908 computes the difference between the raw video pixel data of the video source 905 and the predicted pixel data 913 from the motion compensation module 930 or intra-prediction module 925 as prediction residual 909. The transform module 910 converts the difference (or the residual pixel data or residual signal 908) into transform coefficients (e.g., by performing Discrete Cosine Transform, or DCT). The quantization module 911 quantizes the transform coefficients into quantized data (or quantized coefficients) 912, which is encoded into the bitstream 995 by the entropy encoder 990.

The inverse quantization module 914 de-quantizes the quantized data (or quantized coefficients) 912 to obtain transform coefficients, and the inverse transform module 915 performs inverse transform on the transform coefficients to produce reconstructed residual 919. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. In some embodiments, the filtering or smoothing operations performed by the in-loop filter 945 include deblock filter (DBF), sample adaptive offset (SAO), and/or adaptive loop filter (ALF).

Figure 10:
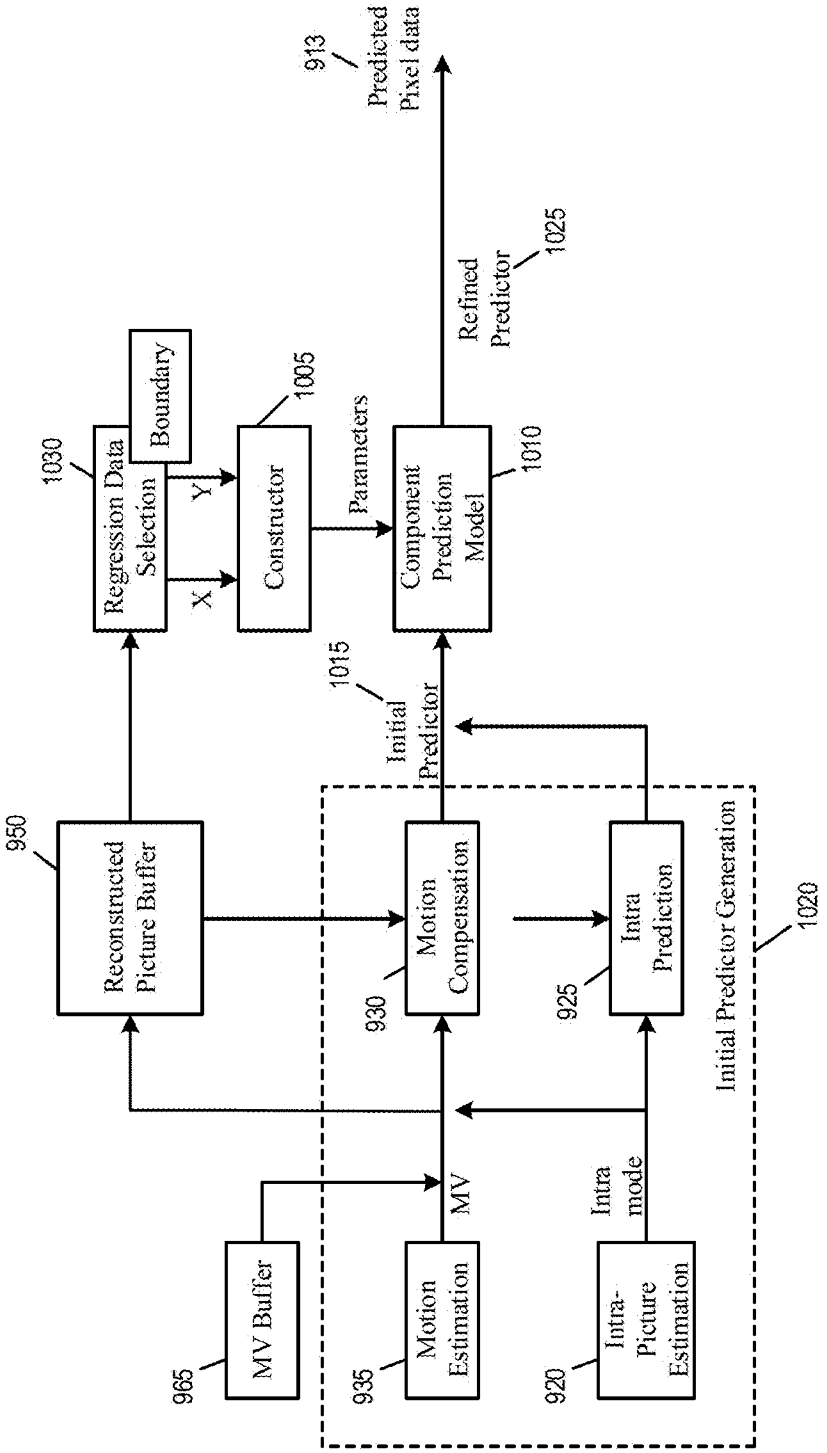
FIG. 10 illustrates portions of the video encoder that derives and uses a component prediction model.

FIG. 10 illustrates portions of the video encoder 900 that derives and uses a component prediction model. As illustrated, an initial predictor generation module 1020 provides an initial predictor 1015 to a component predictor model 1010. The initial predictor 1015 may include component samples (luma or chroma) of a reference block for predicting the component samples of the current block, or component samples of the current block for cross-component prediction. The component prediction model 1010 is applied to the initial predictor 1015 to generate a refined predictor 1025. The samples of the refined predictor 1025 may be used as the predicted pixel data 913.

When the current block is coded by inter-prediction, the motion estimation module 935 provides a MV that is used by the motion compensation module 930 to identify a reference block in a reference picture. When the current block is coded by intra-prediction, the intra-prediction estimation module 920 provide an intra mode or BV that is used by the intra-prediction module 925 to identify a reference block in the current picture. The initial predictor generation module may provide the component samples of the reference block as the initial predictor 1015 of the current block. In some embodiments, the luma component samples of the current block is used as an initial predictor of the current block.

To derive the component prediction model 1010, a regression data selection module 1030 retrieves the required component samples from the reconstructed picture buffer 950 to serve as regression data. In some embodiments, the required component samples are that of pixels in a reference area and an extension area. Reference area and extension areas are described by reference to FIG. 4 above. The reference area and the extension area may be in and/or around the current block and in and/or around the reference block. The retrieved regression data (i.e., the required component samples) include reference samples (X) and current samples (Y) used to determine the coefficients or parameters of the component prediction model 1010. The current samples may refer to target chroma samples, while the reference samples may refer to luma samples used to generate the corresponding predicted chroma samples, including collocated luma samples and their surrounding luma samples.

The regression data selection module 1030 may determine whether a component sample required for the model derivation is unavailable or forbidden based on a certain boundary. For example, in some embodiments, reconstructed samples within the current block may be unavailable for model derivation; in some embodiments, reconstructed samples outside of a current data pipeline unit may be unavailable for model derivation. If a component sample is required for model derivation yet is unavailable, the regression data selection module may generate padding samples in place of the unavailable sample by e.g., replicating the nearest valid component sample. The handling of unavailable component samples that are required for model derivation is described by reference to FIGS. 5-8 above.

A model constructor 1005 uses the regression data (X and Y) to derive the parameters of the component prediction model 1010 using techniques such as elimination method, iteration method, or decomposition method. The component prediction model 1010 may be a higher-degree model having multiple filter taps such as Eq. (10) or Eq. (11) above.

Figure 11:
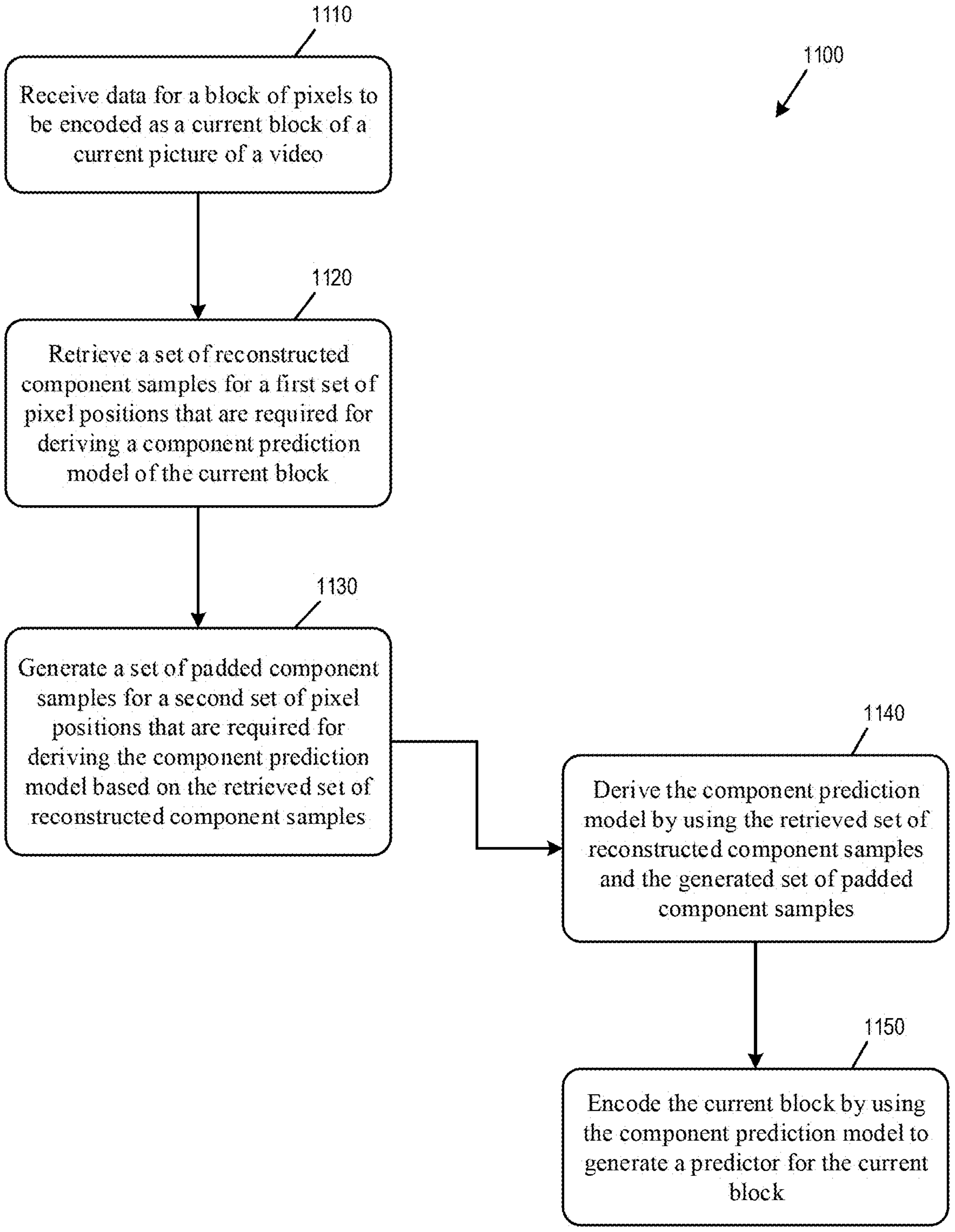
FIG. 11 conceptually illustrates a process for deriving a component prediction model with handling for unavailable samples.

FIG. 11 conceptually illustrates a process 1100 for deriving a component prediction model with handling for unavailable samples. In some embodiments, one or more processing units (e.g., a processor) of a computing device implementing the encoder 900 performs the process 1100 by executing instructions stored in a computer readable medium. In some embodiments, an electronic apparatus implementing the encoder 900 performs the process 1100.

The encoder receives (at block 1110) data to be encoded as a current block of pixels in a current picture. The encoder retrieves (at block 1120) a set of reconstructed component samples for a first set of pixel positions that are required for deriving a component prediction model of the current block. The encoder generates (at block 1130) a set of padded component samples for a second set of pixel positions that are required for deriving the component prediction model based on the retrieved set of reconstructed component samples. The encoder may generate each padded component sample by replicating a nearest retrieved reconstructed component sample, or a predefined value, or a middle value defined by a bit-depth of a current sample.

In some embodiments, the second set of pixel positions are designated as having unavailable or forbidden reconstructed samples based on a boundary. The second set of pixel positions may correspond to component samples inside the current block. The second set of pixel positions may correspond to component samples in a left-above neighboring area of the current block. The second set of pixel positions may be outside a data pipeline unit that encompasses the current block. The boundary may be that of a buffer storing one or more rows of reconstructed coding tree units (CTUs).

In some embodiments, the component prediction model is derived by corresponding target component samples and predicted component samples, with each predicted component sample generated based on a collocated component sample and a set of surrounding component samples (e.g., "N", "S", "W", "E", "NW", "NE", "SE", "SW" samples surrounding a collocated sample "C").

In some embodiments, surrounding component samples at pixel positions beyond the boundary are replaced by padded component samples. The component prediction model may be a cross-component model, such that the target component samples are chroma samples, and the collocated and surrounding component samples are luma samples.

In some embodiments, the target component samples and the collocated component samples are samples of a reference area neighboring the current block. Some of the surrounding component samples may be samples in an extension area just beyond the reference area.

The encoder derives (at block 1140) the component prediction model by using the retrieved set of reconstructed component samples and the generated set of padded component samples. The encoder encodes (at block 1150) the current block by using the component prediction model to generate a predictor for the current block. The predictor of the current block may include predicted chroma samples that are generated by applying the component prediction model to luma samples of the current block. The predictor is used to produce prediction residuals.

VI. Example Video Decoder

In some embodiments, an encoder may signal (or generate) one or more syntax element in a bitstream, such that a decoder may parse said one or more syntax element from the bitstream.

Figure 12:
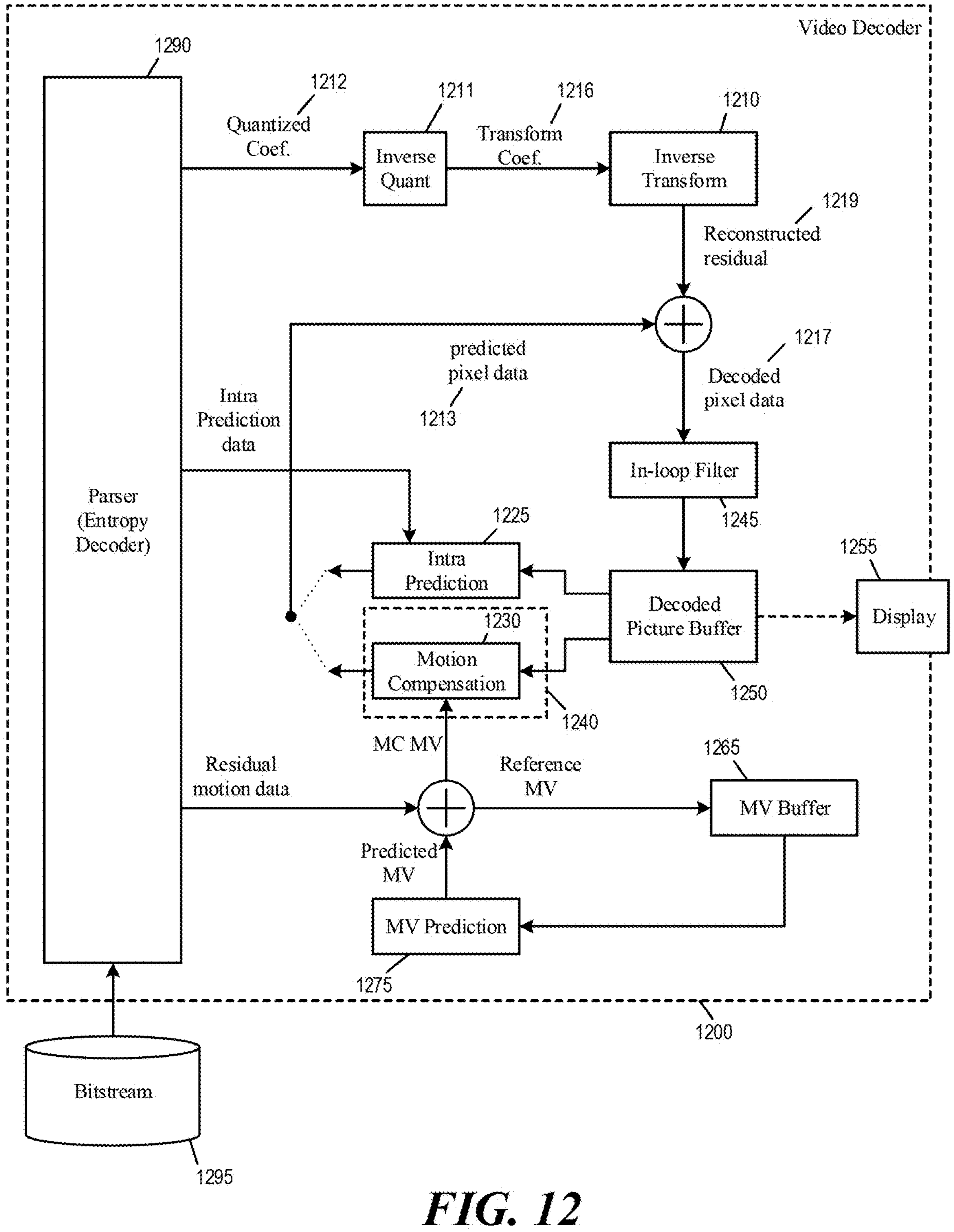
FIG. 12 illustrates an example video decoder that may implement component prediction model.

FIG. 12 illustrates an example video decoder 1200 that may implement component prediction model. As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219. The reconstructed residual signal 1219 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering or smoothing operations performed by the in-loop filter 1245 include deblock filter (DBF), sample adaptive offset (SAO), and/or adaptive loop filter (ALF).

Figure 13:
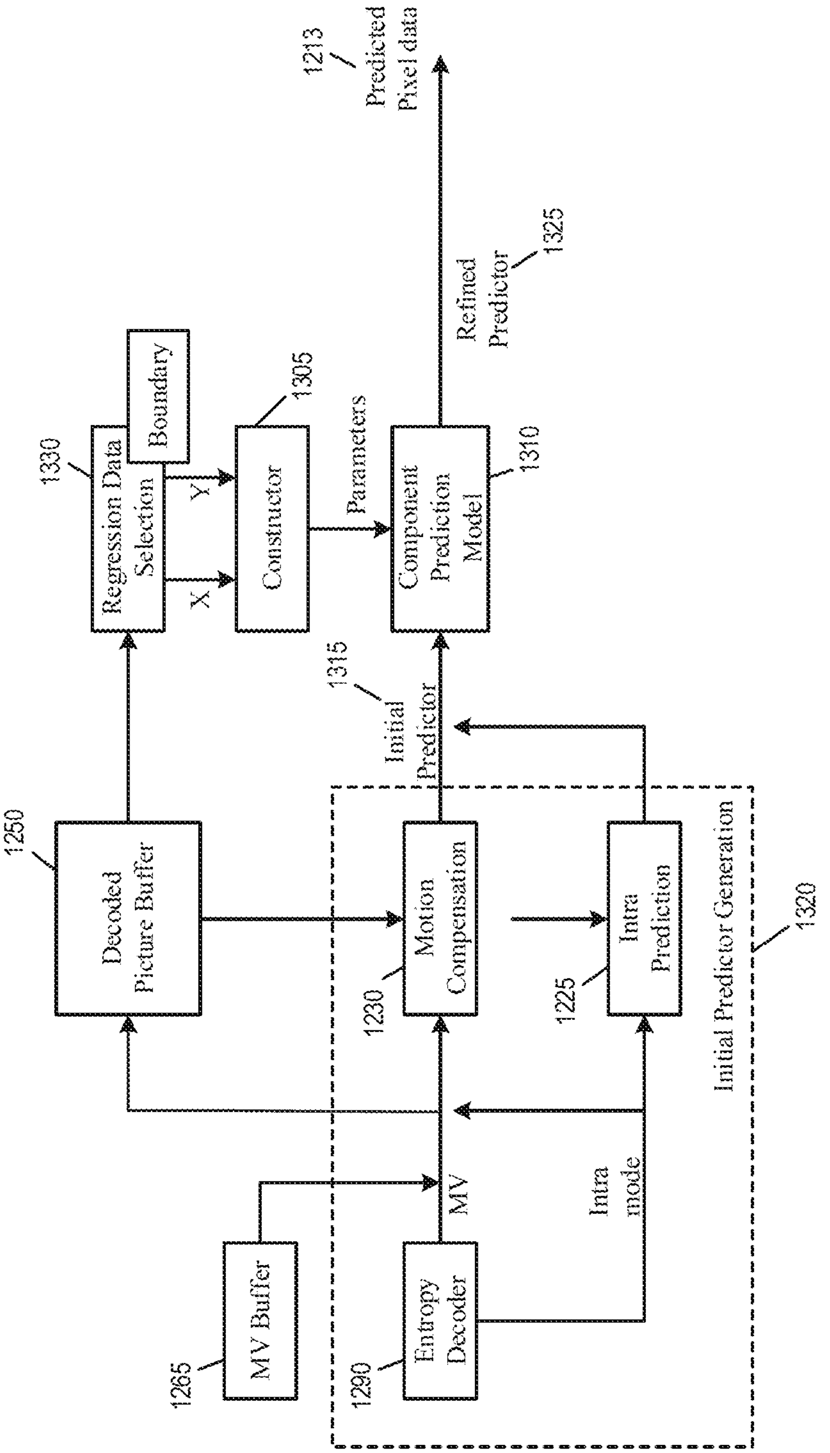
FIG. 13 illustrates portions of the video decoder that derives and uses a component prediction model.

FIG. 13 illustrates portions of the video decoder 1200 that derives and uses a component prediction model. As illustrated, an initial predictor generation module 1320 provides an initial predictor 1315 to a component predictor model 1310. The initial predictor 1315 may include component samples (luma or chroma) of a reference block for predicting the component samples of the current block, or component samples of the current block for cross-component prediction. The component prediction model 1310 is applied to the initial predictor 1315 to generate a refined predictor 1325. The samples of the refined predictor 1325 may be used as the predicted pixel data 1213.

When the current block is coded by inter-prediction, the entropy decoder 1290 may provide a MV that is used by the motion compensation module 1230 to identify a reference block in a reference picture. When the current block is coded by intra-prediction, the entropy decoder 1290 may provide an intra mode or BV that is used by the intra-prediction module 1225 to identify a reference block in the current picture. The initial predictor generation module may provide the component samples of the reference block as the initial predictor 1315 of the current block. In some embodiments, the luma component samples of the current block is used as an initial predictor of the current block.

To derive the component prediction model 1310, a regression data selection module 1330 retrieves the required component samples from the decoded picture buffer 1250 to serve as regression data. In some embodiments, the required component samples are that of pixels in a reference area and an extension area. Reference area and extension areas are described by reference to FIG. 4 above. The reference area and the extension area may be in and/or around the current block and in and/or around the reference block. The retrieved regression data (i.e., the required component samples) include reference samples (X) and current samples (Y) used to determine the coefficients or parameters of the component prediction model 1310. The current samples may refer to target chroma samples, while the reference samples may refer to luma samples used to generate the corresponding predicted chroma samples, including collocated luma samples and their surrounding luma samples.

The regression data selection module 1330 may determine whether a component sample required for the model derivation is unavailable or forbidden based on a certain boundary. For example, in some embodiments, reconstructed samples within the current block may be unavailable for model derivation; in some embodiments, reconstructed samples outside of a current data pipeline unit may be unavailable for model derivation. If a component sample is required for model derivation yet is unavailable, the regression data selection module may generate padding samples in place of the unavailable sample by e.g., replicating the nearest valid or already retrieved component sample. The handling of unavailable component samples that are required for model derivation is described by reference to FIGS. 5-8 above.

A model constructor 1305 uses the regression data (X and Y) to derive the parameters of the component prediction model 1310 using techniques such as elimination method, iteration method, or decomposition method. The component prediction model 1310 may be a higher-degree model having multiple filter taps such as Eq. (10) or Eq. (11) above.

Figure 14:
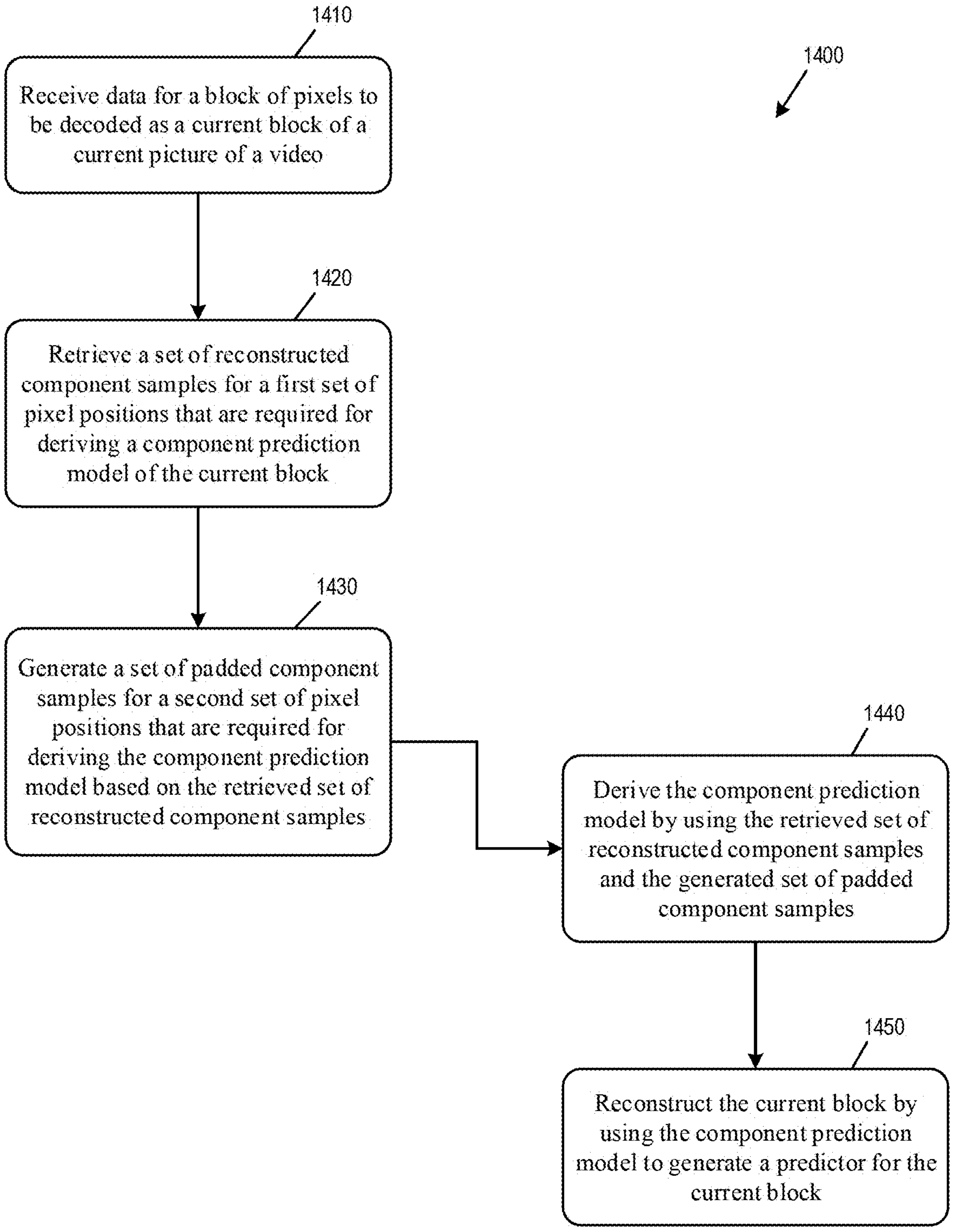
FIG. 14 conceptually illustrates a process for deriving a component prediction model with handling for unavailable samples.

FIG. 14 conceptually illustrates a process 1400 for deriving a component prediction model with handling for unavailable samples. In some embodiments, one or more processing units (e.g., a processor) of a computing device implementing the decoder 1200 performs the process 1400 by executing instructions stored in a computer readable medium. In some embodiments, an electronic apparatus implementing the decoder 1200 performs the process 1400.

The decoder receives (at block 1410) data to be decoded as a current block of pixels in a current picture. The decoder retrieves (at block 1420) a set of reconstructed component samples for a first set of pixel positions that are required for deriving a component prediction model of the current block. The decoder generates (at block 1430) a set of padded component samples for a second set of pixel positions that are required for deriving the component prediction model based on the retrieved set of reconstructed component samples. The decoder may generate each padded component sample by replicating a nearest retrieved reconstructed component sample, a predefined value, or a middle value defined by a bit-depth of a current sample.

In some embodiments, the second set of pixel positions are designated as having unavailable or forbidden reconstructed samples based on a boundary. The second set of pixel positions may correspond to component samples inside the current block. The second set of pixel positions may correspond to component samples in a left-above neighboring area of the current block. The second set of pixel positions may be outside a data pipeline unit that encompasses the current block. The boundary may be that of a buffer storing one or more rows of reconstructed coding tree units (CTUs).

In some embodiments, the component prediction model is derived by corresponding target component samples and predicted component samples, with each predicted component sample generated based on a collocated component sample and a set of surrounding component samples (e.g., “N”, “S”, “W”, “E”, “NW”, “NE”, “SE”, “SW” samples surrounding a collocated sample “C”). In some embodiments, surrounding component samples at pixel positions beyond the boundary are replaced by padded component samples. The component prediction model may be a cross-component model, such that the target component samples are chroma samples, and the collocated and surrounding component samples are luma samples.

In some embodiments, the target component samples and the collocated component samples are samples of a reference area neighboring the current block. Some of the surrounding component samples may be samples in an extension area just beyond the reference area.

The decoder derives (at block 1440) the component prediction model by using the retrieved set of reconstructed component samples and the generated set of padded component samples. The decoder reconstructs (at block 1450) the current block by using the component prediction model to generate a predictor for the current block. The predictor of the current block may include predicted chroma samples that are generated by applying the component prediction model to luma samples of the current block. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term “software” is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
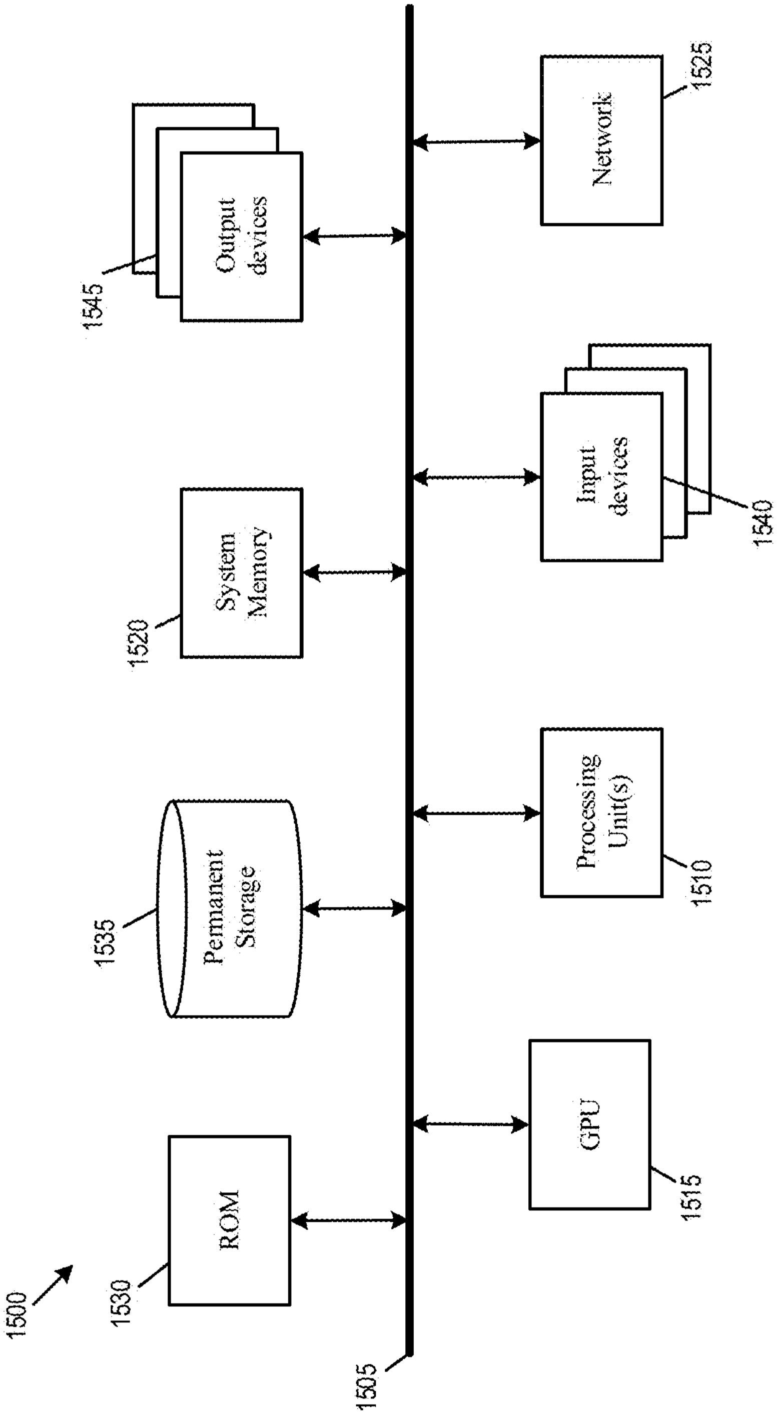
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are used by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor uses at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11 and FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

retrieving a set of reconstructed component samples for a first set of pixel positions that are required for deriving a component prediction model of the current block;

generating a set of padded component samples for a second set of pixel positions that are required for deriving the component prediction model based on the retrieved set of reconstructed component samples;

deriving the component prediction model by using the retrieved set of reconstructed component samples from a line of available samples and the generated set of padded component samples derived from the line of available samples used to pad an unavailable line of samples; and encoding or decoding the current block by using the component prediction model to generate a predictor for the current block.

2. The video coding method of claim 1, wherein generating a padded component sample comprises replicating one of (i) a nearest retrieved reconstructed component sample, (ii) a predefined value, or (iii) a middle value defined by a bit-depth of a current sample.

3. The video coding method of claim 1, wherein the second set of pixel positions are designated as having unavailable reconstructed samples based on a boundary.

4. The video coding method of claim 3, wherein the second set of pixel positions correspond to component samples inside the current block.

5. The video coding method of claim 3, wherein the second set of pixel positions correspond to component samples inside a left-above neighboring area of the current block.

6. The video coding method of claim 3, wherein the second set of pixel positions are outside a data pipeline unit that encompasses the current block.

7. The video coding method of claim 3, wherein the boundary is that of a buffer storing one or more rows of reconstructed coding tree units (CTUs).

8. The video coding method of claim 1, wherein the component prediction model is derived by corresponding target component samples and predicted component samples, each predicted component sample generated based on a collocated component sample and a set of surrounding component samples.

9. The video coding method of claim 8, wherein surrounding component samples at pixel positions beyond a boundary are replaced by padded component samples.

10. The video coding method of claim 8, wherein the target component samples are chroma samples, wherein the collocated and surrounding component samples are luma samples.

11. The video coding method of claim 8, wherein the target component samples and the collocated component samples are samples of a reference area neighboring the current block.

12. The video coding method of claim 1, wherein the predictor of the current block comprises predicted chroma samples that are generated by applying the component prediction model to luma samples of the current block.

13. An electronic apparatus comprising:

a video coder circuit configured to perform operations comprising:

receiving data for a block of pixels to be encoded or decoded as a current block of a current picture of a video;

retrieving a set of reconstructed component samples for a first set of pixel positions that are required for deriving a component prediction model of the current block;

generating a set of padded component samples for a second set of pixel positions that are required for deriving the component prediction model based on the retrieved set of reconstructed component samples;

deriving the component prediction model by using the retrieved set of reconstructed component samples from a line of available samples and the generated set of padded component samples derived from the line of available samples used to pad an unavailable line of samples; and encoding or decoding the current block by using the component prediction model to generate a predictor for the current block.

14. A video decoding method comprising:

receiving data for a block of pixels to be decoded as a current block of a current picture of a video;

retrieving a set of reconstructed component samples for a first set of pixel positions that are required for deriving a component prediction model of the current block;

generating a set of padded component samples for a second set of pixel positions that are required for deriving the component prediction model based on the retrieved set of reconstructed component samples;

deriving the component prediction model by using the retrieved set of reconstructed component samples from a line of available samples and the generated set of padded component samples derived from the line of available samples used to pad an unavailable line of samples; and reconstructing the current block by using the component prediction model to generate a predictor for the current block.

* * * * *